United States Patent
Kaji et al.

(10) Patent No.: US 11,971,104 B2
(45) Date of Patent: Apr. 30, 2024

(54) GROMMET

(71) Applicants: KINUGAWA RUBBER IND. CO., LTD., Chiba (JP); Honda Motor Co., Ltd., Tokyo (JP)

(72) Inventors: Yasuhisa Kaji, Chiba (JP); Hayato Takahashi, Chiba (JP); Hiroko Katayama, Chiba (JP); Yuya Hamamoto, Tokyo (JP)

(73) Assignees: KINUGAWA RUBBER IND. CO., LTD., Chiba (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/826,556

(22) Filed: May 27, 2022

(65) Prior Publication Data

US 2022/0381346 A1     Dec. 1, 2022

(30) Foreign Application Priority Data

May 31, 2021   (JP) .................................. 2021-91065

(51) Int. Cl.
*F16J 15/3204*   (2016.01)

(52) U.S. Cl.
CPC ................................ *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3028; F16J 15/3212; F16J 15/3216; F16J 15/322; F16J 15/3224; F16J 15/3232

USPC ........................................................... 277/549
See application file for complete search history.

(56) References Cited

U.S. PATENT DOCUMENTS

2002/0050181 A1\*  5/2002  Kaji .......................... F16J 3/043
                                                        74/18

FOREIGN PATENT DOCUMENTS

| JP | 2011-79473   | A |   | 4/2011 |
|----|--------------|---|---|--------|
| JP | 2015-55326   | A |   | 3/2015 |
| JP | 2015055326   | A | * | 3/2015 |
| JP | 2016055831   | A | * | 4/2016 |
| JP | 2018027737   | A | * | 2/2018 |

\* cited by examiner

*Primary Examiner* — Nathan Cumar
(74) *Attorney, Agent, or Firm* — Foley & Lardner LLP

(57) ABSTRACT

A grommet G according to the present invention is provided with, on the outer side of a second flexible portion 22, a padding portion 4. With this, of a pressing force F which acts from the cylindrical base part 1 side to the seal portion 3 side, a panel parallel component F1 parallel to a dash panel DP is hardly transmitted. On the other hand, a panel vertical component F2 vertical to the dash panel DP is easily transmitted. Consequently, the panel vertical component F2 becomes relatively large, and even if the seal portion 3 is brought into contact with the dash panel DP by acting the pressing force F from the oblique direction, the rolling-up caused by the occurrence of the inclination of the seal portion 3 can be suppressed.

3 Claims, 7 Drawing Sheets

GROMMET

BACKGROUND

The present invention relates to a grommet which is applied to, for example, an automobile, and which covers the periphery of a steering shaft passing through a vehicle body panel (so-called dash panel) which partitions between a vehicle cabin and an engine room.

A conventional grommet Gx shown in FIG. 6 has a cylindrical shape and is made of a predetermined rubber material, and is interposed between a steering shaft SH constituting the steering shaft of a steering device mounted on a vehicle and a shaft through hole DP1 of a dash panel DP of a vehicle body through which the steering shaft SH passes. That is, a first end side of the grommet Gx is attached to the upper part of a steering gear box GB, and a second end side of the grommet Gx comes in elastic contact with a vehicle outside hole edge DP2 of the shaft through hole DP1, so as to suppress the entering of rainwater and dust through the shaft through hole DPL More specifically, the grommet Gx is attached such that a first seal portion 101 formed in a diameter enlarged shape on a first end side of a cylindrical base part 100 surrounding the steering shaft SH comes in tight contact with the outer side of a gear box cylindrical portion GB1 provided at the upper part of the steering gear box GB. On the other hand, the grommet Gx is attached such that a second seal portion 102 is formed on a second end side of the cylindrical base part 100 via a flexible part 103 bent outward in a folded shape comes in elastic contact with the vehicle outside hole edge DP2 of the shaft through hole DP1 with an elastic force generated by the bending of the flexible part 103.

In addition, as a grommet having a similar configuration mentioned above, one described in, for example, Japanese Patent Application Publication No. 2011-79473 has been known.

SUMMARY

The attachment of the conventional grommet Gx is performed in a manner that, in a state in which the first seal portion 101 is externally fitted to the gear box cylindrical portion GB1 of the steering gear box GB in advance, the steering shaft SH is inserted through the shaft through hole DP1 of the dash panel. DP, and with this, the second seal portion 102 is brought into contact with the vehicle outside hole edge DP2 of the shaft through hole DP1.

However, when the grommet Gx is attached as above, there is case where the attachment direction of the grommet Gx is limited in order to avoid the interference with other components mounted in the engine room of a vehicle. In particular, the second seal portion 102 cannot be attached so as to vertically come in contact with the vehicle outside hole edge DP2 of the shaft through hole DP1, and there is therefore case where it is necessary to attach the second seal portion 102 in a state of obliquely coming in contact with the vehicle outside hole edge DP2 of the shaft through hole DP1. In this case, a pressing force F which acts on the flexible part 103 obliquely acts on the vehicle outside hole edge DP2 of the shaft through hole DP1.

Consequently, according to the configuration of the conventional grommet Gx, since the thickness of the flexible part 103 is relatively thin as compared with the thickness of the cylindrical base part 100 and the rigidity of the flexible part 103 is relatively low as compared with the rigidity of the cylindrical base part 100, most of the pressing force F is therefore released to the outside in the direction in which the flexible part 103 extends, namely, in the horizontal direction, as a result of which a panel parallel component F1 becomes relatively large as compared with a panel vertical component F2. Consequently, a pressing force (panel vertical component F2) with respect to the vehicle outside hole edge DP2 of the shaft through hole DP1 cannot be sufficiently obtained, and as shown in FIG. 7, there is possibility that due to the attachment of the grommet Gx from the oblique direction, the second seal portion 102 is inclined, and is rolled up.

In view of the foregoing, the present invention is one for solving at least a part of the above technical problem. An object of the present invention is to provide a grommet which is capable of suppressing the rolling-up of a seal portion even if the seal portion is brought into contact with a dash panel by acting a pressing force from the oblique direction, and it can be realized by the following aspect.

A grommet includes: a cylindrical base part having a cylindrical shape which covers an outer peripheral side of a steering shaft passing through a shaft through hole formed by penetrating a dash panel of a vehicle body which partitions between a vehicle cabin and an engine room; a flexible part provided so as to be expanded outward in a radial direction of the cylindrical base part from an axial end portion of the cylindrical base part, so as to be axially and flexibly deformed; and a seal portion provided to a distal end portion of the flexible part so as to come in contact with a vehicle outside hole edge of the shaft through hole in a state of being attached to the vehicle body, wherein the flexible part includes a first flexible portion provided so as to extend outward in the radial direction of the cylindrical base part from the axial end portion of the cylindrical base part, and a second flexible portion provided so as to extend in a curved shape on a seal portion side from the first flexible portion, and having a bending portion which is axially bendable, and wherein a padding portion is provided on an outer side of the second flexible portion such that a thickness of the second flexible portion is thicker than that of the first flexible portion.

DETAILED DESCRIPTION

In the following, an embodiment of a grommet according to the present invention will be explained in detail based on the drawings. In addition, in the following embodiment, one in which, similar to the conventional one, the grommet according to the present invention is applied to a steering device of an automobile is shown.

(Configuration of Grommet)

Figure 1:
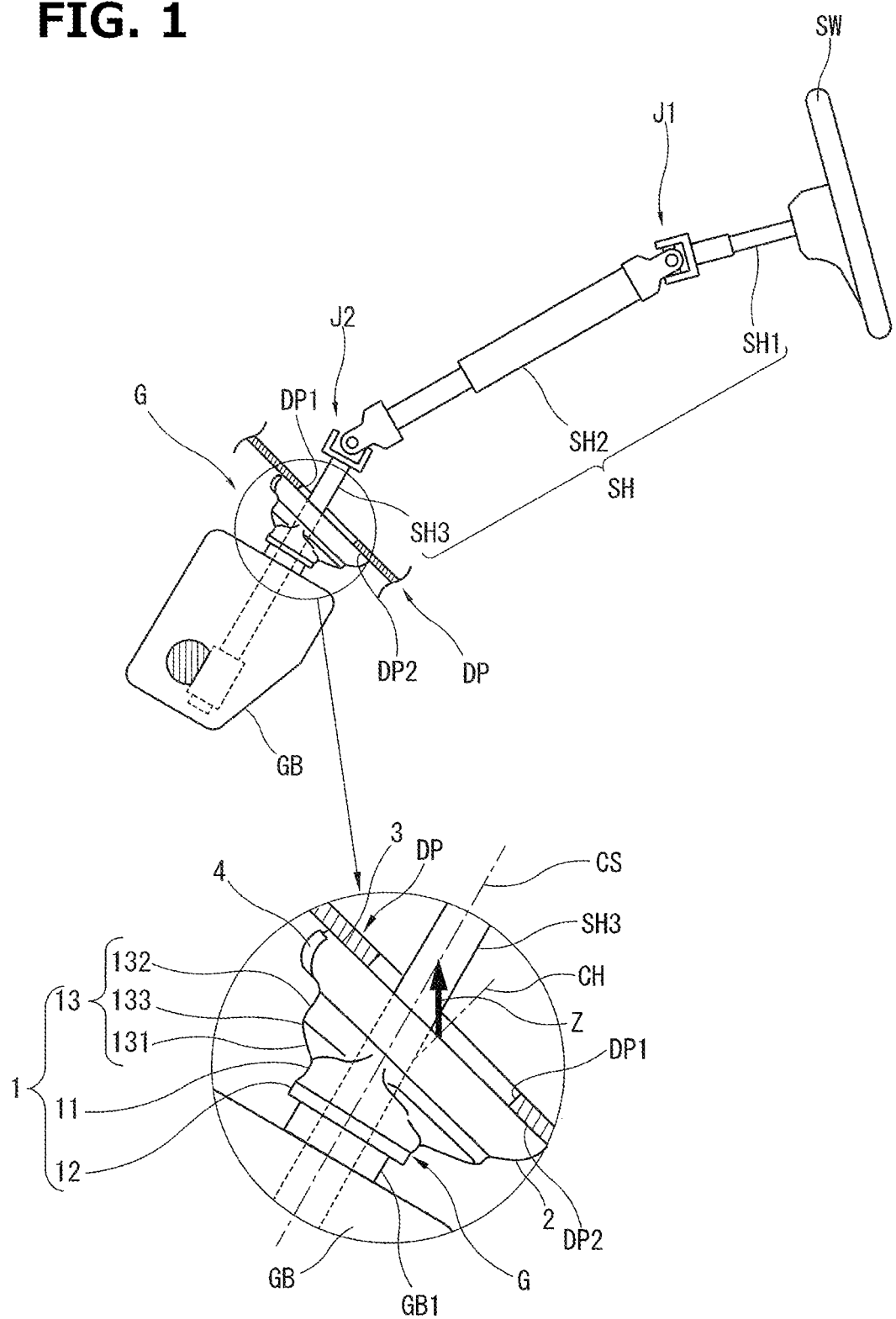
FIG. 1 is a main part sectional view in a state in which a steering device including a grommet according to the present invention is attached to a vehicle body.

FIG. 1 is a main part sectional view in a state in which a steering device including a grommet G is attached to a vehicle body, and shows a schematic diagram of the steering device in which only a dash panel DP is shown as a sectional view. In addition, in the following explanation, based on the vertical direction of the vehicle body, the upper side in FIG. 1 which corresponds to the upper side in the vertical direction is referred to as "upper", and the lower side in FIG. 1 which corresponds to the lower side in the vertical direction is referred to as "lower".

As shown in FIG. 1, the steering device is provided with a steering shaft SH including first to third steering shafts SH1 to SH3 connected to each other via first and second universal joints J1, J2 that are well-known universal joints. In the steering shaft SH, the first steering shaft SH1 positioned on the second end side in the axial direction faces the inside of the vehicle cabin, and is connected to a steering wheel SW. In addition, in the steering shaft SH, the third steering shaft SH3 positioned on the first end side in the axial direction passes through the dash panel DP that is a vehicle body panel so as to face the inside of the engine room, and a distal end side of the third steering shaft SH3 is linked to wheels not shown via a predetermined steering mechanism (for example, a rack and pinion mechanism) accommodated inside a steering gear box GB.

Moreover, the grommet G for keeping watertight between the inside and the outside of the vehicle cabin is interposed between a shaft through hole DP1 formed by penetrating the dash panel DP and the third steering shaft SH3. The grommet G has a cylindrical shape and is made of a predetermined rubber material. In addition, the grommet G includes a cylindrical base part 1 which covers the outer periphery of the third steering shaft SH3 passing through the dash panel DP, a flexible part 2 which is provided so as to extend radially outward in a curved shape from the second end portion (upper end portion) in the axial direction of the cylindrical base part 1 and which is flexibly deformable in the axial direction of the third steering shaft SH3, and a seal portion 3 which is provided to the distal end portion (upper end portion) of the flexible part 2 and which is capable of coming in contact with an vehicle outside hole edge DP2 of the shaft through hole DP1 in a state of being attached to the vehicle body (dash panel DP), and these are integrally formed by molding.

The cylindrical base part 1 includes a general section 11 which covers the outer periphery of the third steering shaft SH3, an attachment base section 12 which has a diameter enlarged stepwisely toward the axial first end side (lower end side) of the general section 11 and which is attached to a gear box cylindrical portion GB1 having a substantially cylindrical shape which is provided to the upper end portion of the steering gear box GB, and a connection base section 13 which has a diameter reduced toward the axial second end side (upper end side) of the general section 11 and which connects between the general section 11 and the flexible part 2.

The general section 11 is formed in a substantially cylindrical shape, and is provided so as to extend along the axial direction of the third steering shaft SH3 so as to be inclined with respect to the dash panel DP. In other words, the cylindrical base part 1 is provided so as to extend along a center axial line CS of the third steering shaft SH3 which intersects a center axial line CH of the shaft through hole DP1.

The attachment base section 12 is provided so as to have a diameter enlarged stepwisely with respect to the general section 11, and has, on the inner peripheral side thereof, a lip not shown which is provided so as to come in tight contact with the outer peripheral surface of the gear box cylindrical portion GB1. That is, in the attachment base section 12, the lip not shown tightly comes in contact with the outer peripheral surface of the gear box cylindrical portion GB1 so as to liquid-tightly seal between the attachment base section 12 and the gear box cylindrical portion GB1.

The connection base section 13 is bent in a bending shape with respect to the general section 11, and is provided so as to extend along the center axial line CH of the shaft through hole DP1. In addition, the connection base section 13 is formed in an enlarged diameter shape with respect to the general section 11, and is set to have an outer diameter larger than that of the general section 11 and smaller than that of the flexible part 2. Specifically, the connection base section 13 includes a conical tapered first connection base portion 131 extending radially outward from the axial second end portion (upper end portion) of the general section 11 so as to be inclined, and a second connection base portion 132 extending from the upper end portion of the first connection base portion 131 substantially along the center axial line CH. In addition, a bending portion 133 formed to be thinner than the first and second connection base portions 131, 132 is provided between the first connection base portion 131 and the second connection base portion 132 (see FIG. 3).

The flexible part 2 is continuously provided in an endless state over the whole circumferential area of the second connection base portion 132 at the upper end portion of the second connection base portion 132, and is formed so as to be flexibly deformable in the axial direction of the third steering shaft SH3. Then, the seal portion 3 is provided at the upper end portion of the flexible part 2, seal portion 3 which is capable of elastically coming in contact with the vehicle outside hole edge DP2 of the shaft through hole DP1 based on an elastic force generated by the flexible deformation of the flexible part 2.

According to the above configuration, the grommet G is disposed in the nipped and held state by the gear box cylindrical portion GB1 of the steering gear box GB and the vehicle outside hole edge DP2 of the shaft through hole DP1 in the dash panel DP, and based on the elastic force of the flexibly deformed flexible part 2, the attachment base section 12 of the cylindrical base part 1 elastically comes in contact with the end surface of the gear box cylindrical portion GB1 of the steering gear box GB and the seal portion 3 elastically comes in contact with the vehicle outside hole edge DP2 of the shaft through hole DP1 in the dash panel DP, and thereby the grommet G is attached and held to the vehicle body while exhibiting a seal function.

In addition, an arrow Z shown in FIG. 1 indicates the attachment direction of the grommet G to the vehicle body (dash panel DP). That is, in order to avoid the interference with other components mounted in the engine room which is not shown in the drawings, the grommet G is not attached in the direction in which the seal portion 3 vertically comes in contact with the dash panel DP, but is attached such that the seal portion 3 obliquely comes in contact with the dash panel DP as shown by the arrow Z in FIG. 1.

Figure 2:
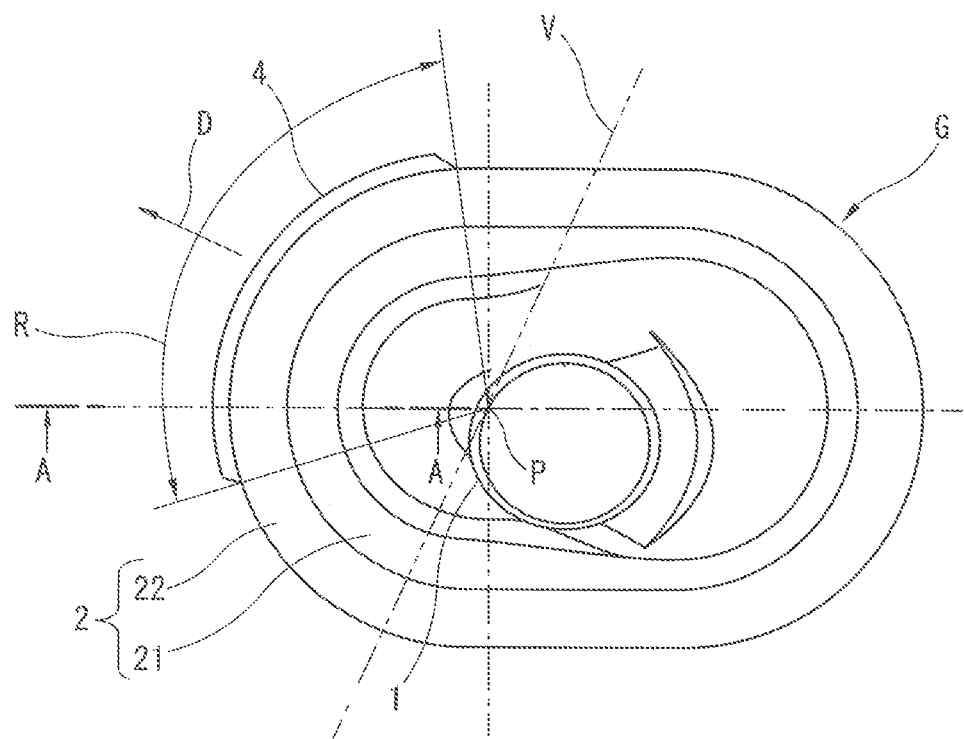
FIG. 2 is a bottom plane view of the grommet shown in FIG. 1.

FIG. 2 is a bottom plane view of the grommet G when the grommet G shown in FIG. 1 is viewed from the seal portion 3 side.

As shown in FIG. 2, in a plane view, in the grommet G, the general section 11 and the attachment base section 12 of the cylindrical base part 1 are formed in substantially true circular shapes, and the connection base section 13, the flexible part 2 and the seal portion 3 are formed in elliptical shapes (oval shapes) extending in the right and left directions in FIG. 2. In addition, an arrow D shown in FIG. 2 indicates the horizontally moving direction of the grommet G (hereinafter is referred to as a "grommet attachment direction") when the grommet G is attached to the vehicle body (dash panel DP shown in FIG. 1).

In addition, in the grommet G, a padding portion 4 is provided in a circumferential area shown by "R" in FIG. 2, which is an area on the outer side of the after-mentioned second flexible portion 22 in the flexible part 2, such that the second flexible portion 22 becomes thicker than the after-mentioned first flexible portion 21. It is preferable that the padding portion 4 is formed to extend within a range of approximately 45 degrees (circumferential area R) so as to extend toward the both sides in the circumferential direction with reference to the grommet attachment direction D.

In addition, in the grommet attachment direction D side, namely, in the circumferential area R of the second flexible portion 22, the padding portion 4 only needs to be provided only in an area on the grommet attachment direction D side from a grommet attachment direction orthogonal line V which passes through a center P of the flexible part 2 and which is orthogonal to the grommet attachment direction D. In other words, the forming range of the padding portion 4 can be arbitrarily set, and is not always limited to the range of the circumferential area R shown in FIG. 2.

Figure 3:
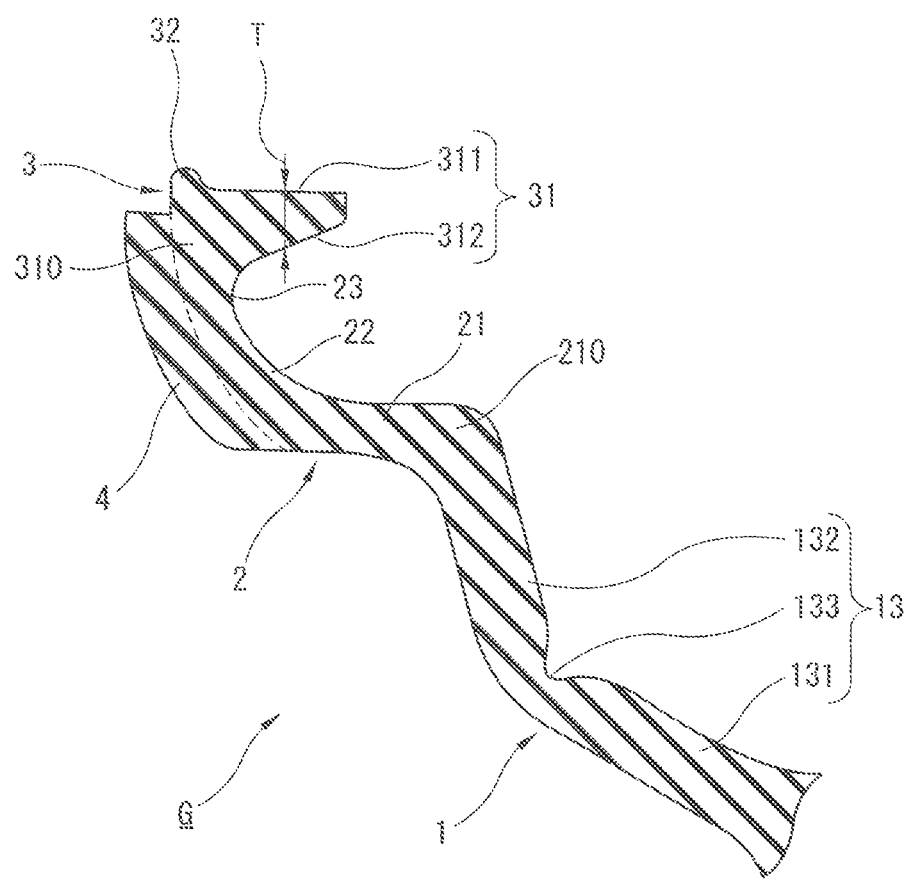
FIG. 3 is a main part enlarged view in cross section taken along a ling A-A of FIG. 2 in a free state of the grommet.
Figure 4:
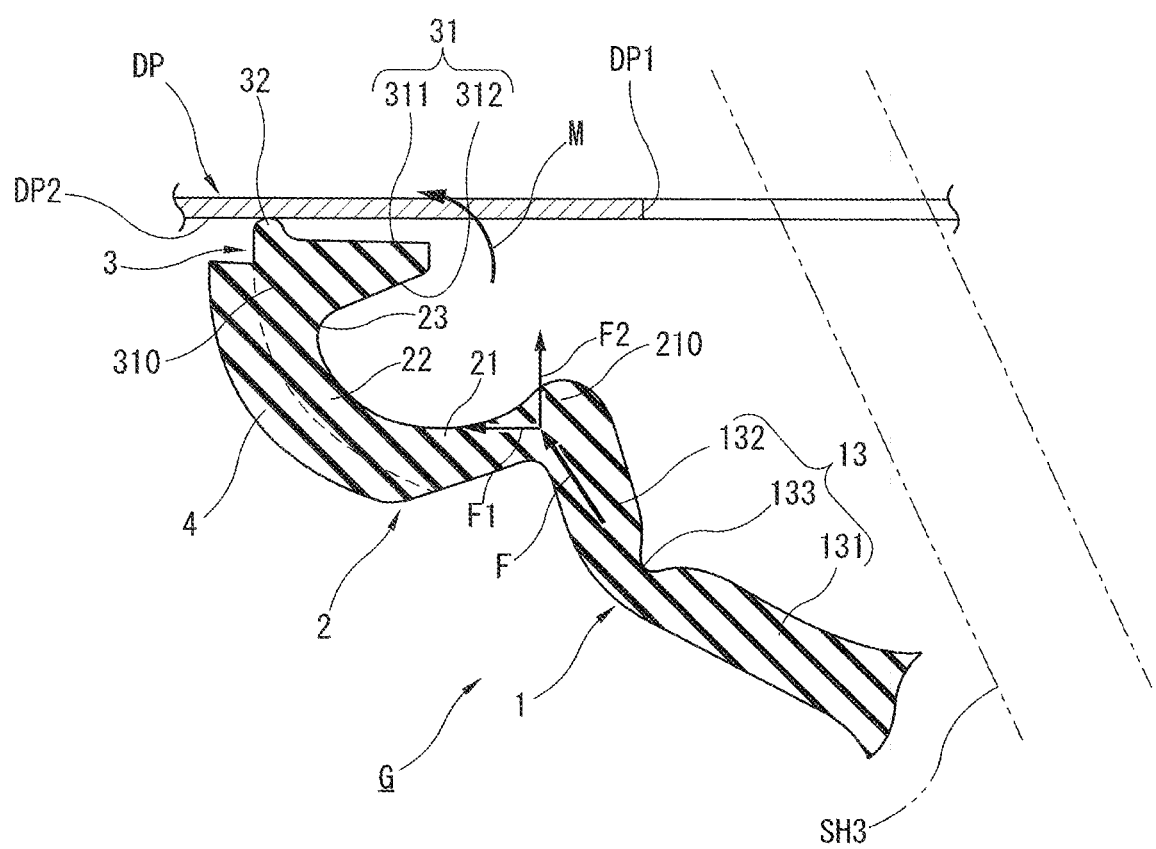
FIG. 4 is a main part enlarged view in cross section taken along a line A-A of FIG. 2 in an attached state of the grommet.

FIG. 3 is a main part enlarged view of a cross section of the grommet G which is taken along a ling A-A of FIG. 2 in the free state of the grommet G. In addition, FIG. 4 is a main part enlarged view of a cross section of the grommet G which is taken along a line A-A of FIG. 2 in a state in which the flexible part 2 is flexibly deformed when the grommet G is attached to the vehicle body (dash panel DP).

As particularly shown in FIG. 3, the flexible part 2 includes a first flexible portion 21 provided so as to extend outward in the radial direction of the cylindrical part 1 from the axial second end portion (upper end portion) of the cylindrical part 1 (second connection base portion 132), and a second flexible portion 22 provided so as to extend in a curved shape from the first flexible portion 21 toward the seal portion 3 side. That is, in the flexible part 2, the first flexible portion 21 and the second flexible portion 22 each have a substantially fixed thickness thinner than that of the cylindrical base part 1, and is provided so as to be expanded radially outward from the axial second end portion (upper end portion) of the cylindrical base part 1, so as to be flexibly deformed in the axial direction of the third steering shaft SH3.

As shown in FIG. 3, in the free state of the grommet G, the first flexible portion 21 is formed horizontally so as to have a substantially fixed distance to a seal lip 32, or is formed such that the distance to the seal portion 3 (panel facing surface 311) gradually decreases as it goes to the second flexible portion 22 side. In other words, in FIG. 3, the first flexible portion 21 is formed such that a root portion 210 side connected to the connection base section 13 (second connection base portion 132) is the lowest, or is formed in an inclined shape so as to extend gradually upward toward the second flexible portion 22 side.

The second flexible portion 22 has a circular arc shape in cross section which is expanded radially outward from the distal end portion of the first flexible portion 21 toward the seal portion 3 (root portion 310 of support part 31), and includes a bending portion 23 capable of being axially bent, in the middle in the axial direction of the third steering shaft SH3 (see FIG. 1). That is, the second flexible portion 22 is provided so as to be flexibly deformed in the axial direction by using the bending portion 23 as a bending point, and based on a pressing force F which acts on the root portion 210 of the first flexible portion 21 from the cylindrical base part 1 side, the second flexible portion 22 is flexibly deformed axially, thereby allowing the distal end side of the support part 31 to be pressed to the dash panel DP as shown in an arrow M shown in FIG. 4.

The seal portion 3 incudes a support part 31 provided at the distal end portion of the second flexible portion 22 so as to extend radially inward, and a seal lip 32 which is provided at the outer peripheral edge portion of the support part 31 so as to protrude therefrom and which comes in contact with the vehicle outside hole edge DP2 of the shaft through hole DP1. That is, in the seal portion 3, the seal lip 32 elastically comes in contact with the vehicle outside hole edge DP2 of the shaft through hole DP1 based on the elastic force generated by the flexible deformation of the flexible part 2, thereby water-tightly sealing the vehicle outside hole edge DP2 of the shaft through hole DP1.

A thickness T on the outer peripheral side of the support part 31 is the largest, and the thickness T gradually decreases from the outer peripheral side toward the inner peripheral side, such that the support part 31 has a substantially trapezoidal cross section. Specifically, as shown in FIG. 3, in the free state of the grommet G, the support part 31 has a panel facing surface 311 arranged substantially parallel to the first flexible portion 21, and, in a state in which the grommet G is attached to the vehicle not shown in the drawings, the panel facing surface 311 is formed so as to be substantially parallel to the dash panel DP. On the other hand, as shown in FIG. 3, in the free state of the grommet G, a panel opposite-direction-facing surface 312 of the support part 31 is formed in a tapered shape inclined upward from the outer peripheral side toward the inner peripheral side.

The seal lip 32 is provided at the outer peripheral side end edge of the panel facing surface 311 of the support part 31 so as to protrude therefrom, so as to be continuously provided in an endless state over the whole circumferential area of the panel facing surface 311 of the support part 31. That is, the seal lip 32 tightly comes in contact with the whole periphery of the vehicle outside hole edge DP2 of the shaft through hole DP1 in the dash panel DP, and the vehicle outside hole edge DP2 is water-tightly sealed, thereby suppressing the entering of water and dust into the vehicle cabin from the outside of the vehicle through the vehicle outside hole edge DP2.

In addition, in the predetermined circumferential area R in the second flexible portion 22 (see FIG. 2), as shown in FIG. 3 and FIG. 4, the padding portion 4 is provided on the outer side of the second flexible portion 22 such that the thickness of the second flexible portion 22 becomes thicker than that of the first flexible portion 21. The padding portion 4 is provided integrally with the second flexible portion 22 with a substantially fixed thickness so as to be formed along the outer side of the second flexible portion 22, and extends from the connection portion of the second flexible part 22 to the first flexible portion 21 to the middle position of the support part 31.

More specifically, as shown in FIG. 3, in the free state of the grommet G, the padding portion 4 is provided such that the lower end portion thereof that is the axial end portion on the cylindrical base part 1 side is located at the same height position as the root portion 210 of the first flexible portion 21 or at a position lower than the root portion 210 of the first flexible portion 21. Namely, the padding portion 4 extends to the connection portion of the second flexible portion 22 to the first flexible portion 21. Here, the lower end portion that is the axial first end portion of the padding portion 4 is flatly formed so as to be smoothly continued along the outer side surface of the first flexible portion 21 (see FIG. 3).

Figure 5:
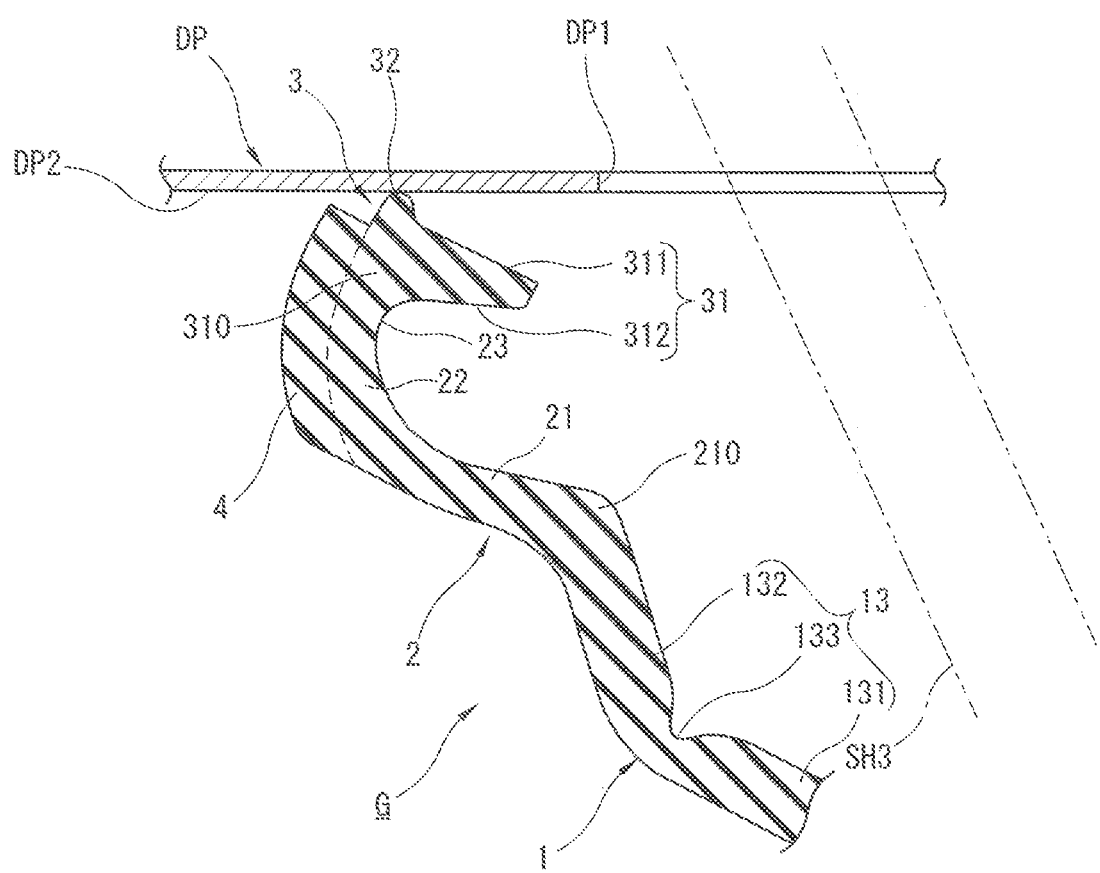
FIG. 5 is a main part enlarged view in cross section taken along a line A-A of FIG. 2 in a state in which a seal portion is inclined when the grommet is attached.

On the other hand, as shown in FIG. 3 and FIG. 4, the padding portion 4 extends such that the upper end portion thereof that is the axial end portion on the seal portion 3 side is located at the middle position on the outer side of the support part 31 in the seal portion 3. More specifically, the padding portion 4 extends such that the upper end portion is located at a position at which the upper end portion of the padding portion 4 does not come in contact with the dash panel DP even if the inner peripheral side of the support part 31 is inclined in the direction away from the dash panel DP (see FIG. 5) when the grommet G is attached.

(Working Effect of the Present Invention)

In the following, while explaining the attachment procedure of the grommet G, characteristic working effects of the grommet G will be explained.

When the grommet G is attached, first, the first end portion (attachment base section 12 of cylindrical base part 1) of the grommet G through which the third steering shaft SH3 has passed is fitted to the gear box cylindrical portion GB1 of the steering gear box GB. After that, while the third steering shaft SH3 which faces outside from the seal portion 3 side is inserted into the shaft through hole DP1, the second end portion (seal lip 32 of seal portion 3) of the grommet G elastically comes in contact with the vehicle outside hole edge DP2 of the shaft through hole DP1. Consequently, the grommet G is held in a nipped state between the steering gear box GB and the dash panel DP, and the grommet G is attached to the vehicle body, together with the steering device.

At this time, in order to avoid the interference with other components mounted in the engine room of the vehicle, there is case where the attachment direction (for example, arrow Z shown in FIG. 1) of the grommet G is limited. That is, the grommet G cannot to be attached such that the seal portion 3 vertically comes in contact with the dash panel DP, and the seal portion 3 is therefore attached in a state of obliquely coming in contact with the dash panel DP. In such an attaching mode, the pressing force F which acts on the flexible part 2 obliquely acts with respect to the dash panel DP.

Figure 6:
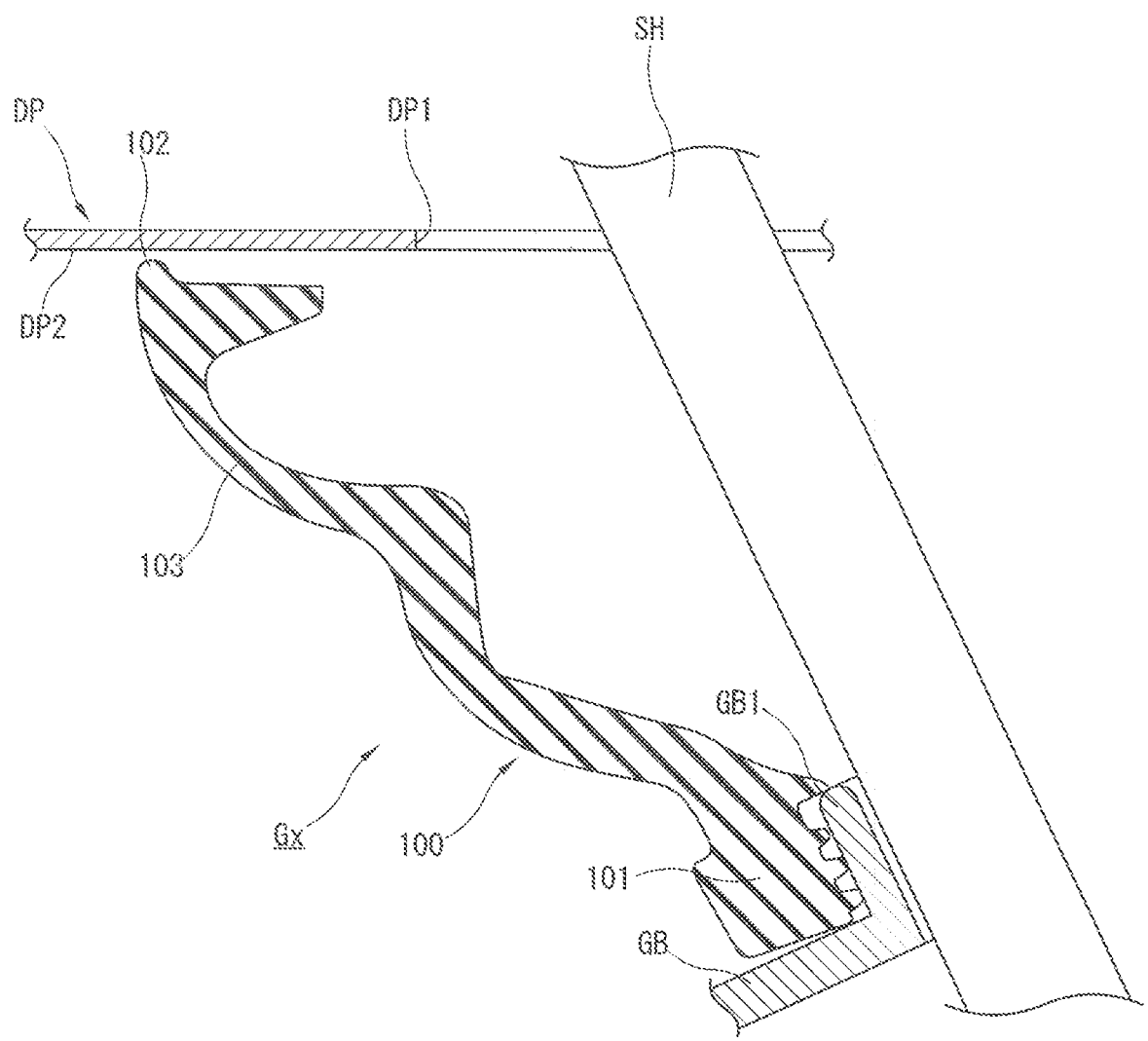
FIG. 6 is a main part enlarged sectional view of a conventional grommet in a free state of the conventional grommet.
Figure 7:
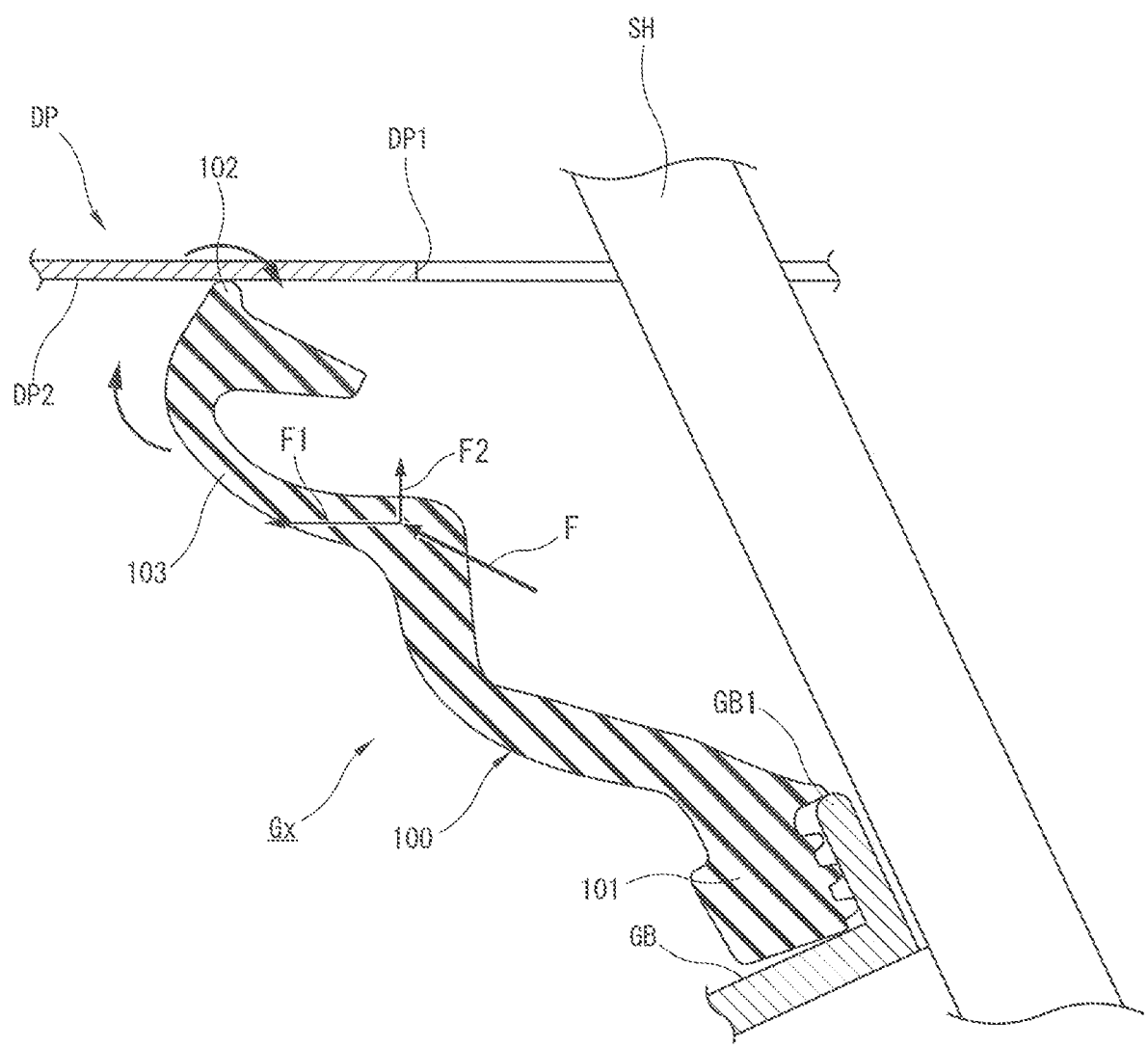
FIG. 7 is a main part enlarged sectional view of the conventional grommet in a state in which a seal portion is inclined when the conventional grommet is attached.

Here, in the configuration of the conventional grommet Gx, as shown in FIG. 6, as compared with a cylindrical part 100, the thickness of a flexible part 103 is relatively thin, and the rigidity on the flexible part 103 side is relatively low as compared with the cylindrical base part 100. With this, most of the pressing force F is therefore released to the outside in the direction in which the flexible part 103 extends, namely, in the horizontal direction, as a result of which a panel parallel component F1 becomes relatively large as compared with a panel vertical component F2. Consequently, a pressing force (panel vertical component F2) with respect to the dash panel DP cannot be sufficiently obtained, and as shown in FIG. 7, there is possibility that, since the grommet Gx is obliquely attached to the dash panel DP, the second seal portion 102 is inclined, and the rolling-up occurs.

In contrast, in the grommet G according to the present embodiment, by the padding portion 4 provided on the outer side of the second flexible portion 22, the rigidity of the second flexible portion 22 including the bending portion 23 that is a flexible portion on the seal portion 3 side is improved, as a result of which the rigidity of the first flexible portion 21 that is a flexible portion on the cylindrical base part 1 side becomes relatively low. Consequently, of the pressing force F which acts from the cylindrical base part 1 side to the seal portion 3 side, the panel parallel component F1 parallel to the dash panel DP is hardly transmitted to the seal portion 3 side due to the improvement of the rigidity of the second flexible portion 22 by the padding portion 4. On the other hand, the panel vertical component F2 vertical to the dash panel DP is easily transmitted to the seal portion 3 side due to the relative lowering of the rigidity of the first flexible portion 21. Consequently, the panel vertical component F2 of the pressing force F which acts from the cylindrical base part 1 side to the seal portion 3 side can be sufficiently secured.

In this way, according to the grommet G according to the present embodiment, since the padding portion 4 is provided on the outer side of the second flexible portion 22, of the pressing force F which acts from the cylindrical base part 1 side to the seal portion 3 side, the panel parallel component F1 parallel to the dash panel DP is hardly transmitted to the seal portion 3 side. On the other hand, the panel vertical component F2 vertical to the dash panel DP is easily transmitted to the seal portion 3 side. Consequently, the panel vertical component F2 becomes relatively large, and the occurrence of the rolling-up caused by the inclination of the seal portion 3 is suppressed, thereby securing excellent water tightness by the seal portion 3.

In addition, in the grommet G according to the present embodiment, in the circumferential area R of the second flexible portion 22, the padding portion 4 is provided only in the area located on the grommet attachment direction D side from the grommet attachment direction orthogonal line V which passes through the center P of the second flexible part 2 (seal portion 3) and which is orthogonal to the grommet attachment direction D.

In this way, in the present embodiment, in the circumferential area R of the second flexible portion 22, the padding portion 4 is provided only in an area located on the grommet attachment direction D side from the grommet attachment direction orthogonal line V, namely, in an area in which the seal portion 3 is easily inclined when the grommet G is attached. Consequently, in the second flexible portion 22, only in the circumferential area R in which the seal portion 3 is easily inclined when the grommet G is attached, the rigidity of the second flexible portion 22 is improved, and the occurrence of the inclination of the seal portion 3 in the area R can be effectively suppressed.

In other words, in the second flexible portion 22, the padding portion 4 is not provided in a circumferential area in which the seal portion 3 is hardly inclined when the grommet G is attached, and thereby the improvement of the unnecessary rigidity of the second flexible portion 22 in this area is suppressed and the occurrence of defects due to the improvement of the unnecessary rigidity of the second flexible portion 22 can be suppressed.

In addition, in the present embodiment, in the free state of the grommet G, the padding portion 4 is formed such that the axial end portion on the cylindrical base part 1 side of the padding portion 4 is located at the same height position as the root portion 210 of the first flexible portion 21 or at a position lower than the root portion 210 of the first flexible portion 21. Consequently, there is no possibility that the root portion 210 side of the first flexible portion 21 does not become an undercut in mold parting at the time when the grommet G is molded, and thereby the moldability of the grommet G can be improved.

In addition, in case where the padding portion 4 is provided so as to extend to the axial end portion of the seal portion 3, there is possibility that when the inner peripheral side of the seal portion 3 is inclined in the direction away from the dash panel DP at the time of the attachment of the grommet G, the axial end portion on the seal portion 3 side of the padding portion 4 comes in contact with the dash panel DP, and the occurrence of the inclination of the seal portion 3 is promoted further.

Therefore, in the grommet G according to the present embodiment, the padding portion 4 is provided so as to extend to a position at which, even if the inner peripheral side of the seal portion 3 is inclined in the direction away from the dash panel DP when the grommet G is attached, the axial end portion on the seal portion 3 side of the padding portion 4 does not come in contact with the dash panel DP. Consequently, it is possible to suppress the problem that the occurrence of the inclination of the seal portion 3 caused by the contact of the axial end portion on the seal portion 3 side of the padding portion 4 with the dash panel DP is further promoted.

The present invention is not limited to the configuration described in the embodiment, and in the configuration of the details of the grommet G, for example, the shape or the size of, for example, the cylindrical base part or the seal portion 3, which does not directly relate to the configuration of the present invention, or a part which directly relates to the configuration of the present invention, such as the padding portion 4, can be freely changed according to the modes of the steering device and the vehicle body as objects to be applied without departing from the scope and spirit of the present invention.

The following summarizes features of the present embodiment.

In the present invention, as one aspect thereof, a grommet includes: a cylindrical base part having a cylindrical shape which covers an outer peripheral side of a steering shaft passing through a shaft through hole formed by penetrating a dash panel of a vehicle body which partitions between a vehicle cabin and an engine room; a flexible part provided so as to be expanded outward in a radial direction of the cylindrical base part from an axial end portion of the cylindrical base part, so as to be axially and flexibly deformed; and a seal portion provided to a distal end portion of the flexible part so as to come in contact with a vehicle outside hole edge of the shaft through hole in a state of being attached to the vehicle body, wherein the flexible part includes a first flexible portion provided so as to extend outward in the radial direction of the cylindrical base part from the axial end portion of the cylindrical base part, and a second flexible portion provided so as to extend in a curved shape on a seal portion side from the first flexible portion, and having a bending portion which is axially bendable, and wherein a padding portion is provided on an outer side of the second flexible portion such that a thickness of the second flexible portion is thicker than that of the first flexible portion. According to the above configuration, by the padding portion provided on the outer side of the second flexible portion, the rigidity of the second flexible portion including the bending portion that is a flexible portion on the seal portion side is improved, as a result of which the rigidity of the first flexible portion that is a flexible portion on the cylindrical base part side is relatively lowered. Consequently, of a pressing force which acts from the cylindrical base part side to the seal portion side, a panel parallel component parallel to the dash panel is hardly transmitted to the seal portion side due to the increasing of the rigidity of the second flexible portion by the padding portion. On the other hand, a panel vertical component vertical to the dash panel is easily transmitted to the seal portion side due to the relative lowering of the rigidity of the first flexible portion. Consequently, the panel vertical component of the pressing force which acts from the cylindrical base part side to the seal portion side can be sufficiently secured.

Here, as a first preferable aspect of the present invention, the grommet is attached such that the seal portion obliquely comes in contact with the dash panel, and, in a circumferential area of the second flexible portion, the padding portion is provided only in an area located on a grommet attachment direction side from a grommet attachment direction orthogonal line which passes through a center of the seal portion and which is orthogonal to a grommet attachment direction. In this way, in case where the grommet is obliquely attached to the dash panel, it is desirable that, in the circumferential area of the second flexible portion, the padding portion is provided only in an area located on the grommet attachment direction side from the grommet attachment direction orthogonal line, namely, in an area in which the inclination of the seal portion easily occurs when the grommet is attached. According to the above configuration, in the second flexible portion, only in the circumferential area in which the inclination of the seal portion easily occurs when the grommet is attached, the rigidity of the second flexible portion is improved, and the occurrence of the inclination of the seal portion in the area can be effectively suppressed. In other words, in the second flexible portion, the padding portion is not provided in a circumferential area in which the inclination of the seal portion hardly occurs when the grommet is attached, and thereby the improvement of the unnecessary rigidity of the second flexible portion in this area is suppressed and the occurrence of defects due to the improvement of the unnecessary rigidity of the second flexible portion can be suppressed.

In addition, as a second preferable aspect of the present invention, in a free state of the grommet, the padding portion is formed such that an axial end portion on the cylindrical base part side of the padding portion is located at a same height position as a root portion of the first flexible portion or at a position lower than the root portion of the first flexible portion. In this way, in the free state of the grommet, the padding portion is formed such that the axial end portion on the cylindrical base part side of the padding portion is located at the same height position as the root portion of the first flexible portion or at a position lower than the root portion of the first flexible portion, and consequently, there is no possibility that the root portion side of the first flexible portion does not become an undercut in mold parting at the time when the grommet is molded, and thereby the moldability of the grommet can be improved.

Moreover, as a third preferable aspect of the present invention, the padding portion is provided so as to extend to a position at which, even if an inner peripheral side of the seal portion is inclined in a direction away from the dash panel when the grommet is attached, an axial end portion on the seal portion side of the padding portion does not come in contact with the dash panel. In this way, by adapting the configuration in which the axial end portion on the seal portion side of the padding portion does not come in contact with the dash panel even in case where the inner peripheral side of the seal portion is inclined in the direction away from the dash panel when the grommet is attached, it is possible to suppress the problem that the occurrence of the inclination of the seal portion caused by the contact of the axial end portion on the seal portion side of the padding portion with the dash panel when the grommet is attached is further promoted.

The entire contents of Japanese Patent Application 2021-91065 filed May 31, 2021 is incorporated herein by reference.

Although the present invention has been described with reference to the present embodiment and its variations, the present embodiment and its variations are intended to facilitate understanding of the present invention and are not intended to limit the present invention thereto. Various changes and modifications may be made to the present embodiment and its variations without departing from the scope of the present invention. The present invention includes equivalents thereof.

The invention claimed is:

1. A grommet comprising:
   a cylindrical base part having a cylindrical shape which covers an outer peripheral side of a steering shaft passing through a shaft through hole formed by penetrating a dash panel of a vehicle body which partitions between a vehicle cabin and an engine room;
   a flexible part provided so as to be expanded outward in a radial direction of the cylindrical base part from an axial end portion of the cylindrical base part, so as to be axially and flexibly deformed; and
   a seal portion provided to a distal end portion of the flexible part so as to come in contact with a vehicle outside hole edge of the shaft through hole in a state of being attached to the vehicle body,
   wherein the flexible part includes a first flexible portion provided so as to extend outward in the radial direction of the cylindrical base part from the axial end portion of the cylindrical base part, and a second flexible portion provided so as to extend in a curved shape on a seal portion side from the first flexible portion, and having a bending portion which is axially bendable,
   wherein a padding portion is provided on an outer side of the second flexible portion such that a thickness of the second flexible portion is thicker than that of the first flexible portion,
   wherein the grommet is attached such that the seal portion obliquely comes in contact with the dash panel, and
   wherein, in a circumferential area of the second flexible portion, the padding portion is provided only in an area located on a grommet attachment direction side from a grommet attachment direction orthogonal line which passes through a center of the seal portion and which is orthogonal to a grommet attachment direction.

2. The grommet according to claim 1, wherein, in a free state of the grommet, the padding portion is formed such that an axial end portion on a cylindrical base part side of the padding portion extends up to an axial end portion on a cylindrical base side of the second flexible portion.

3. The grommet according to claim 1, wherein the padding portion is provided so as to extend to a position at which, even if an inner peripheral side of the seal portion is inclined in a direction away from the dash panel when the grommet is attached, an axial end portion on the seal portion side of the padding portion does not come in contact with the dash panel.

* * * * *